United States Patent
Kristal et al.

(10) Patent No.: US 7,295,322 B2
(45) Date of Patent: Nov. 13, 2007

(54) OPTICAL POWER MEASUREMENT OF A CLOSED LOOP FIBER OPTIC GYROSCOPE

(75) Inventors: Leon Kristal, North Andover, MA (US); Mark Bowser, Dover, MA (US); Rocco Pennacchio, Canton, MA (US)

(73) Assignee: Litton Systems, Inc., Los Angeles, CA (US)

( * ) Notice: Subject to any disclaimer, the term of this patent is extended or adjusted under 35 U.S.C. 154(b) by 239 days.

(21) Appl. No.: 11/105,264

(22) Filed: Apr. 13, 2005

(65) Prior Publication Data
US 2006/0232782 A1    Oct. 19, 2006

(51) Int. Cl.
G01C 19/72    (2006.01)
(52) U.S. Cl. ...................................... 356/464
(58) Field of Classification Search ................ 356/460, 356/464
See application file for complete search history.

(56) References Cited
U.S. PATENT DOCUMENTS

| | | | |
|---|---|---|---|
| 4,545,682 A | 10/1985 | Greenwood | |
| 4,705,399 A * | 11/1987 | Graindorge et al. | 356/464 |
| 5,116,129 A * | 5/1992 | Ishigami | 356/464 |
| 5,141,316 A * | 8/1992 | Lefevre et al. | 356/464 |
| 2003/0169428 A1 | 9/2003 | Lange | |
| 2003/0169956 A1 | 9/2003 | Lange et al. | |
| 2004/0246487 A1 * | 12/2004 | Lehureau | 356/464 |

* cited by examiner

*Primary Examiner*—Samuel A. Turner (57) ABSTRACT

This disclosure describes fiber optic gyroscopes that have integrated power measurement capabilities, and related methods and apparatus. More particularly, it describes determining the optical power of a fiber optic gyroscope (FOG) by temporarily adjusting the phase difference between two counter-propagating light beams, measuring the change in light intensity caused by the phase difference adjustment, and using the measured change in light intensity along with known characteristics of the FOG to compute an optical power value. The temporary adjustment in phase difference is preferably done in such a manner not to disturb the normal operation of the FOG.

12 Claims, 5 Drawing Sheets

| OPM 5 | T0 | T1 | T2 | T3 |
|---|---|---|---|---|
| lcw-ccwl | +45° | −45° | +45° | −45° |
| | 90° | 90° | 90° | 90° |

| |cw-ccw| | 90° | 90° | 90° | 90° |
|---|---|---|---|---|
| | T0 | T1 | T2 | T3 |

FIG. 7

| |cw-ccw| | D1 | D1 | D1 | D1 |
|---|---|---|---|---|
| | T0 | T1 | T2 | T3 |

FIG. 8

| | 51 |
|---|---|
| | temporarily adjusting the phase difference between two counter-propagating light beams |

| | 53 |
|---|---|
| | measuring the change in light intensity caused by the phase difference adjustment |

| | 55 |
|---|---|
| | using the measured change in light intensity along with known characteristics of the FOG to compute an optical power value |

| |cw-ccw| | D1 | D1 | D2 |
|---|---|---|---|
| | T0 | T1 | T2 | T3 |

FIG. 10

| |cw-ccw| | D1 | D1 | D1 | D2 |
|---|---|---|---|---|
| | T0 | T1 | T2 | T3 |
| |cw-ccw| | D1 | D1 | D1 | D2 |
| | T4 | T5 | T6 | T7 |

OPTICAL POWER MEASUREMENT OF A CLOSED LOOP FIBER OPTIC GYROSCOPE

FIELD OF THE INVENTION

The present invention relates generally to closed loop fiber optic gyroscopes and methods of measuring optical power.

BACKGROUND OF THE INVENTION

An optical gyroscope measures the interference pattern generated by two light beams, traveling in opposite directions within a mirrored ring (laser or "ring laser" gyroscopes) or fiber loop (fiber optic gyroscopes), in order to detect very small changes in motion. Optical gyroscopes are based on a principle called the "Sagnac effect" discovered at the beginning of the 20th century. Optical gyroscopes have a variety of applications, but are particularly well suited for use in guidance, navigation, and control systems such as those of aircrafts and spacecrafts. An example of an optical gyroscope can be found in U.S. Pat. No. 4,545,682, incorporated herein by reference in its entirety.

There are several different types of fiber optic gyroscopes including at least interferometer fiber optic gyroscopes (IFOGs) and resonator fiber optic gyroscopes (RFOGs). IFOGs are phase sensitive devices with the Sagnac effect generating an optical phase difference between two counter-propagating light beams/waves in a rotating fiber coil. RFOGs are frequency sensitive devices with the Sagnac effect generating a frequency difference between two resonant beams in a ring fiber cavity locked to resonant clockwise and counter-clockwise frequencies.

IFOGs typically operate in either an open loop or a closed loop configuration. In the closed loop configuration, a phase shift equal in magnitude but opposite in sign to the phase shift generated by the Sagnac effect is generated, and the magnitude of the generated phase shift is then determined from the apparatus generating it.

To provide increased sensitivity at low angular rotation rates, an IFOG can introduce phase modulation between the counter-propagating light beams. An explanation of such bias modulation can be found in U.S. patent application Ser. No. 10/078,182 (Pub. No. US 2003/0169428), incorporated herein by reference in its entirety In many instances an IFOG will comprise an optical receiver or other mechanism for converting the light output (which is a combination of the two counter-propagating beams) by a coil assembly to an analog or digital signal. As the term is used herein, the "optical power" of the IFOG is a measurement of the power of the light being output by the coil assembly and fed into the optical receiver.

Figure 1:
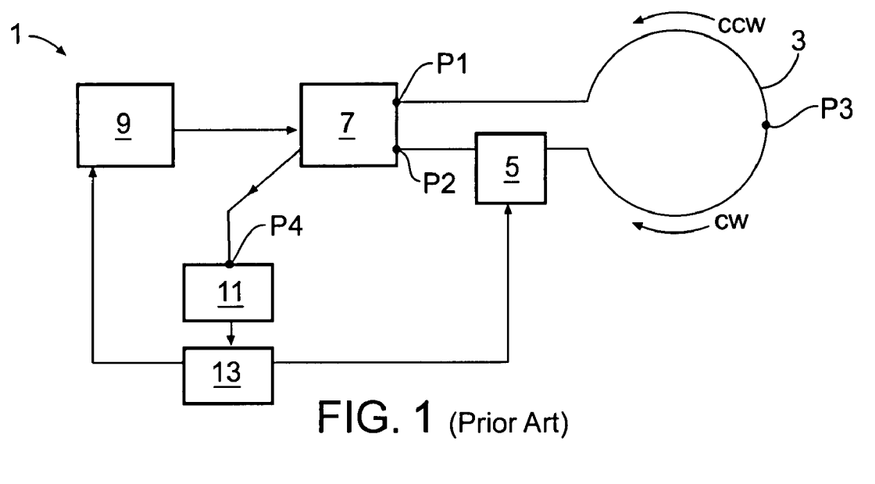
FIG. 1 is a schematic view of an optical gyroscope.

FIG. 1 provides a schematic of an exemplary IFOG. In FIG. 1, an IFOG 1 includes a fiber optic loop 3, an optical phase modulator (OPM) 5, a coupler 7, a light source 9, a photo detector 11, and a control unit 13. A light signal from the light source 9 is split into clockwise (cw) and counter-clockwise (ccw) signals that pass through the fiber optic loop 3 and the OPM 5 before being re-combined in the coupler 7 and directed to the photodetector 11. The output of the photodector 11 is provided to the control unit 13 which controls the OPM 5 and, optionally, the light source 9.

Figure 2:
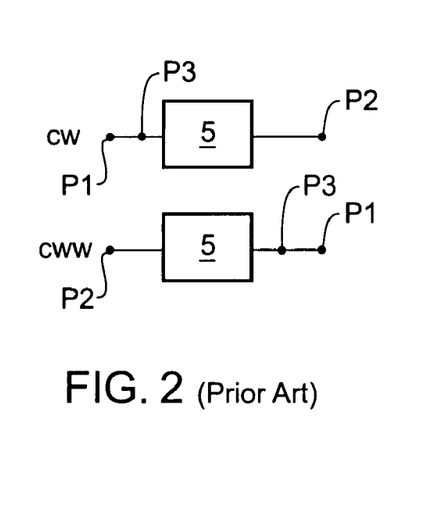
FIG. 2 is a schematic illustrating clockwise and counter-clockwise paths through a portion of the gyroscope of FIG. 1.

FIG. 2 illustrates the paths followed by the cw and ccw signals of the IFOG 1. As shown, the cw signal travels from point P1 at the coupler 7, through point P3 on the loop 3, through the OPM 5, and back into the coupler 7 at point P2. The ccw signal travels from point P2 at the coupler 7, through the OPM 5, through point P3 on the loop 3, and back into the coupler 7 at point P1.

Figure 3:
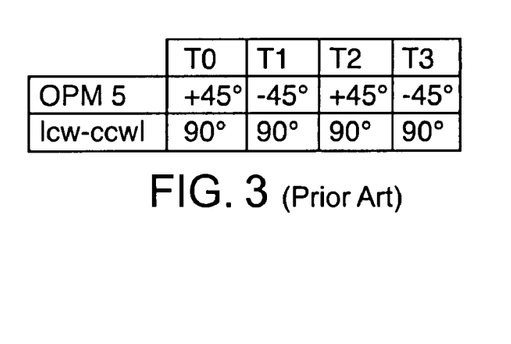
FIG. 3 is a table illustrating a method of controlling the optical phase modulator of the gyroscope of FIG. 1.

FIG. 3 illustrates a method of controlling the OPM 5 where the OPM 5 introduces a phase difference of forty five degrees during each interval T0-T3, with the sign of the phase difference introduced alternating between time intervals. In some instances, the time intervals will correspond to the transit time of light passing through the loop 3 such that there is a ninety degree phase difference between the cw and ccw signals as they re-enter the coupler 7.

Figure 4:
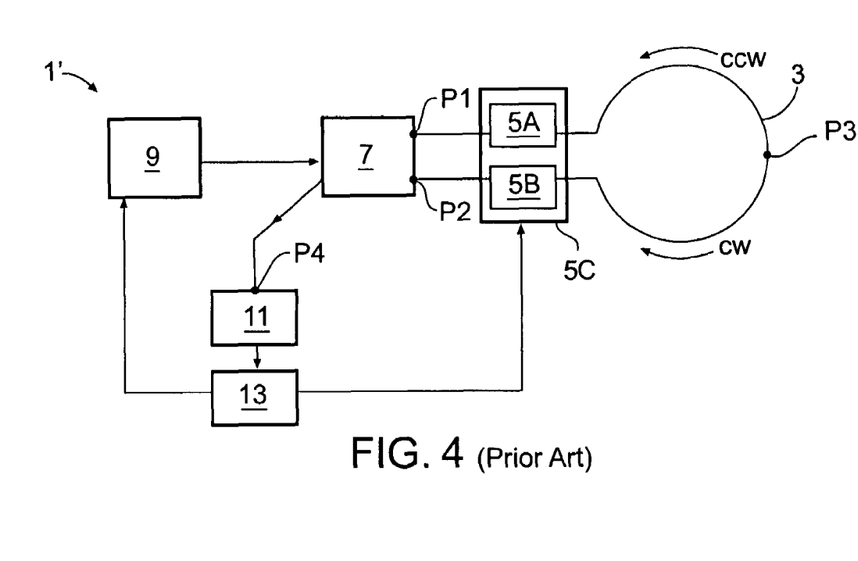
FIG. 4 is a schematic view of an optical gyroscope.

FIG. 4 provides a schematic of an alternate form of the IFOG 1 of FIG. 1. In FIG. 4, the IFOG 1' has all the components of the IFOG 1 of FIG. 1, except that it includes two OPMs 5A and 5B which are both part of a single integrated optical chip 5C in place of the OPM 5 of FIG. 1. The OPMs 5A and 5B are controlled (via control of the IOC 5C) to each provide half of the phase shift seen by the cw and ccw signals.

Figure 5:
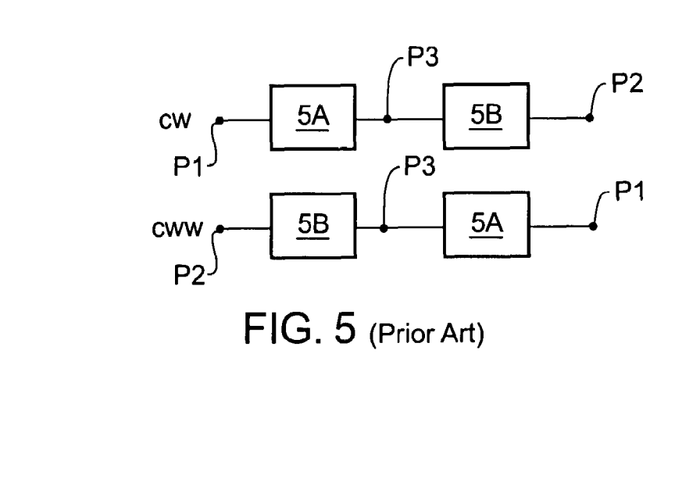
FIG. 5 is a schematic illustrating clockwise and counter-clockwise paths through a portion of the gyroscope of FIG. 4.

FIG. 5 illustrates the paths followed by the cw and ccw signals of the IFOG 1'. As shown, the cw signal travels from point P1 at the coupler 7, through OPM 5A, through the point P3 on the loop 3, through the OPM 5B, and back into the coupler 7 at point P2. The ccw signal travels from point P2 at the coupler 7, through the OPM 5B, through point P3 on the loop 3, through the OPM 5A, and back into the coupler 7 at point P1.

Figure 6:
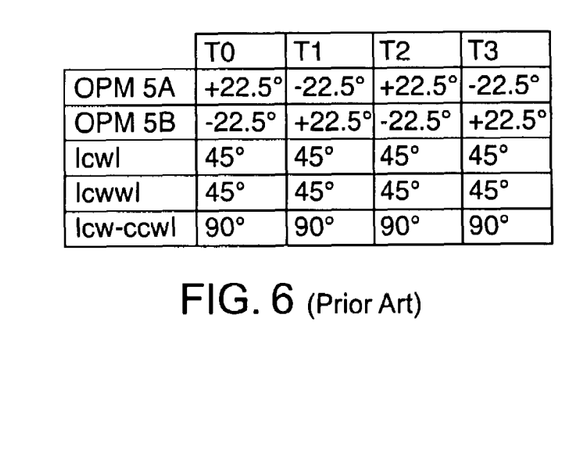
FIG. 6 is a table illustrating a method of controlling the optical phase modulators of the gyroscope of FIG. 4.

FIG. 6 illustrates a method of controlling the OPMs 5A and 5B where the OPMs 5A and 5B each introduce a phase difference of 22.5 degrees during each interval T0-T3, with the sign of the phase difference introduced alternating between time intervals, and the phase difference introduced by the OPM 5A being opposite in sign than that introduced by the OPM 5B. The time intervals T0-T3 each correspond to the transit time of light passing through the loop 3 such that the OPMs 5A and 5B add a total of 45 degrees (2 times 22.5) to each of the cw and ccw signals with the result that there is a ninety degree phase difference between the cw and ccw signals as they re-enter the coupler 7.

Figure 7:
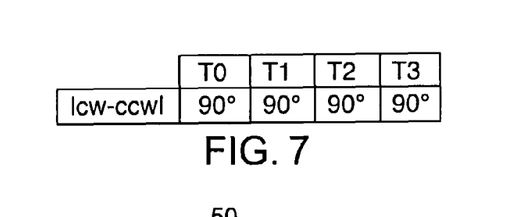
FIG. 7 is a table illustrating a method of controlling phase difference between cw and ccw signals in an optical gyroscope that corresponds to the methods of FIGS. 3 and 6.

It should be noted that for both the IFOG 1 and the IFOG 1', the OPMs (5, 5A, and 5B) are used to control the phase difference between the cw and ccw signals as they are recombined in the coupler 7 before being provided to the photodetector 11, with the signal at point P4 entering/detected by the photodetector 11 being the interference signal resulting from combining the cw and ccw signals. In both the method of FIG. 3 and the method of FIG. 6, the OPMs are controlled to introduce a phase difference of ninety degrees between the cw and ccw signals. As such, both methods can be described in regard to how that phase difference is controlled as shown in FIG. 7 which indicates that the phase difference between the cw and ccw signals during the intervals T0-T4 is always ninety degrees.

Figure 8:
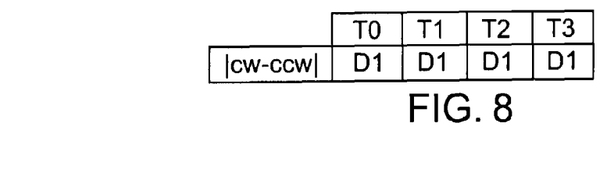
FIG. 8 is a table illustrating a generalized method of controlling phase difference between cw and ccw signals in an optical gyroscope.

As will be discussed, exemplary embodiments of the present invention utilize alternative methods of control than those illustrated in FIGS. 3 and 6-8, and control of OPMs to produce patterns of phase differences will be described. As such, it is useful to generalize the pattern of FIG. 7 such that the pattern of FIG. 7 is seen as a repeated first phase difference D1. D1, which need not be ninety degrees, is introduced at each interval during a sequence of intervals T0-T4. As such, FIG. 8 illustrates the same control pattern as does FIG. 7, but without explicitly identifying a value for D1.

SUMMARY OF THE INVENTION

The present invention is directed to fiber optic gyroscopes having integrated power measurement capabilities, and to related methods and apparatus. More particularly, the present invention is directed to determining the optical power of a fiber optic gyroscope (FOG) by measuring any change in light intensity that corresponds to a known change in phase difference, and using the measured change in light intensity along with the change in phase difference and known characteristics of the FOG to compute an optical power value. Even more particularly, in a preferred embodiment, optical power is determined by temporarily adjusting the phase difference between two counter-propagating light beams, measuring the change in light intensity caused by the phase difference adjustment, and using the measured change in light intensity along with known characteristics of the FOG to compute an optical power value. The temporary adjustment in phase difference is preferably done in such a manner not to disturb the normal operation of the FOG.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the Figures thereof and wherein.

DETAILED DESCRIPTION OF THE PREFERRED EMBODIMENTS

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims.

In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

Figure 9:
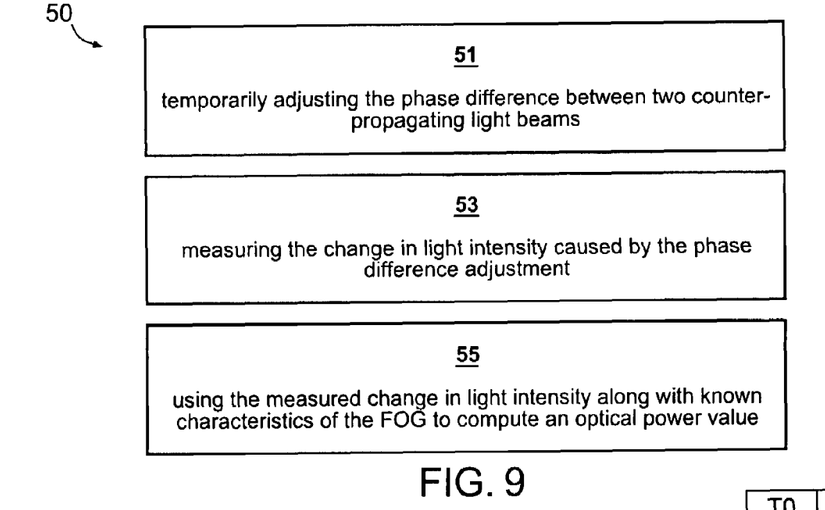
FIG. 9 is a schematic of a method of measuring optical power in accordance with an exemplary embodiment of the invention.

It has been found that the optical power, at least for interferometer fiber optic gyroscopes (IFOGs), can be determined by temporarily adjusting the phase difference between two counter-propagating light beams, measuring the change in light intensity caused by the phase difference adjustment, and using the measured change in light intensity along with known characteristics of the fiber optic gyroscope (FOG) to compute an optical power value. This method is illustrated in FIG. 9 as method 50 including steps 51, 53, and 55. It is contemplated that the use of such a method would be facilitated by providing a gyroscope with one or more mechanisms for performing steps 51, 53, and 55.

Figure 10:
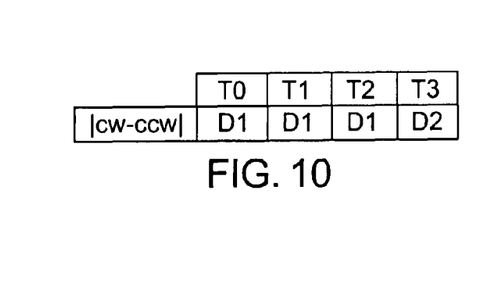
FIG. 10 is a table illustrating a method of controlling phase difference between cw and ccw signals in accordance with an exemplary embodiment of the invention.

An embodiment of the method 50 of FIG. 9 is illustrated in FIG. 10 where the phase difference |cw−ccw| between clockwise and counter-clockwise signals of an interferometer fiber optic gyroscope (IFOG) is kept constant at D1 for three time intervals and then varied to D2 for a fourth. The change in optical power resulting in the change in the phase difference during interval T3 can be used to determine an optical power value for the IFOG. More specifically, the difference between a first light intensity value (or an average of light intensity values) corresponding to the phase difference of any of the intervals T0-T2 and a second light intensity value corresponding to period T3 provides a measure of the optical power output of the IFOG.

Figure 11:
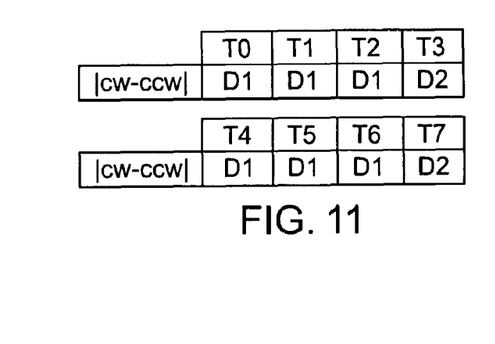
FIG. 11 is a table illustrating another method of controlling phase difference between cw and ccw signals in accordance with an exemplary embodiment of the invention.

The introduction of a temporary phase difference may only occur occasionally, e.g. in response to an input request to determine the optical power, or may occur periodically. In FIG. 11, the phase difference |cw−ccw| is kept at a first value D1 for three intervals, varied to D2 for a fourth, kept at D1 again for three more intervals, and then varied again to D2 at a fourth interval. As such, the difference D2 is periodically introduced at every fourth interval. For clarity, it can be said that the measurement period of the method of FIG. 11 is four intervals, i.e. a four time interval long pattern of phase differences is utilized. Thus, FIG. 11 illustrates two measurement periods, a first measurement period including intervals T0-T3, and a second measurement period including intervals T4-T7. In some instances, a timer interval during which the phase difference is varied to produce a change in light intensity for the purpose of determining optical power may be referred to herein as a power deviation interval.

Figure 12:
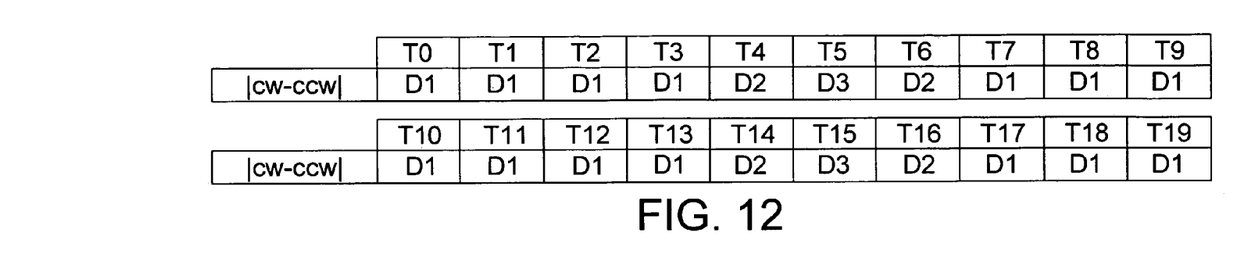
FIG. 12 is a table illustrating yet another method of controlling phase difference between cw and ccw signals in accordance with an exemplary embodiment of the invention.

Although FIG. 11 illustrates a method utilizing a four interval measurement period, the number of intervals in a measurement period will generally vary between embodiments. Moreover, the pattern of phase differences that occurs during a measurement period may vary between more than two different phase differences. This is illustrated in FIG. 12 where a ten interval, three value, method is used. As illustrated, during each measurement period (T0-T9 and T10-T19), the phase difference |cw−ccw| is kept constant at D1 for four intervals, changed to D2 for a fifth interval, changed to D3 for a sixth interval, changed back to D2 for a sixth interval, and the changed back to D1 for the remaining three intervals of each measurement period (T0-T9 and T10-T19).

The temporary adjustment in phase difference is preferably done in such a manner not to disturb the normal operation of the IFOG, i.e. without loss of base rotation data. This allows periodic verification of the IFOG without any loss in functionality. The just described method of varying the phase difference |cw−ccw| illustrated in FIG. 12 accomplishes this.

Figure 13:
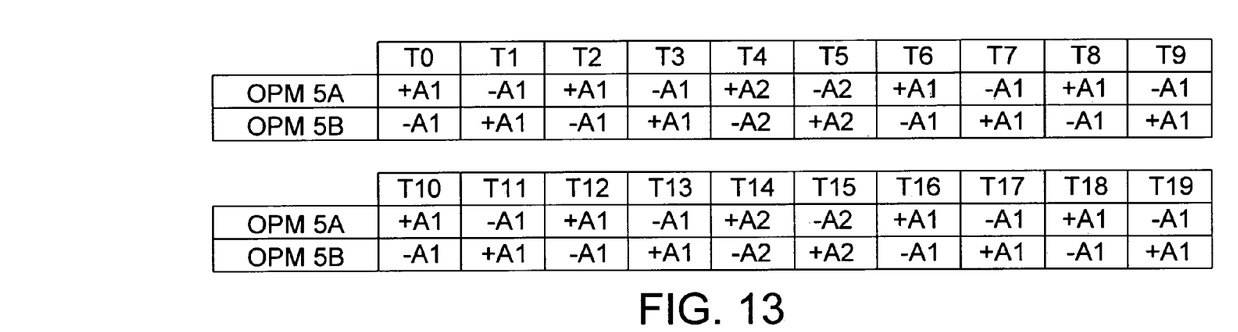
FIG. 13 is a table illustrating a method of controlling optical phase modulators to accomplish the method of FIG. 13.
Figure 14:
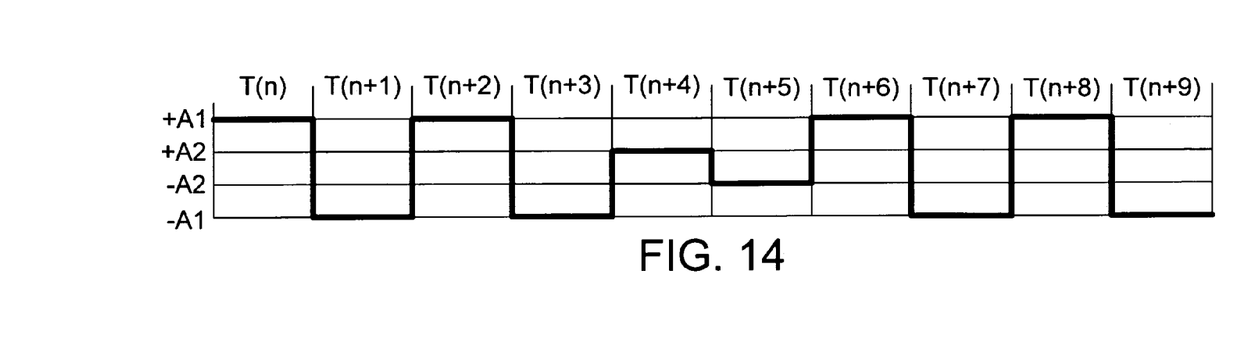
FIG. 14 is a graph illustrating modulation signals corresponding to the method illustrated by FIG. 14.

The pattern of phase differences of the method of FIG. 12 can be accomplished by controlling the optical phase modulators (OPMs) 5A and 5B of the IFOG 1' of FIG. 4 as illustrated in FIGS. 12 and 13. In FIG. 13, an input signal to OPM 5A (provided by the control unit 13) varies between positive and negative values of a first amplitude A1 for intervals T0-T3, varies between positive and negative values of amplitude A2 for intervals T4 and T5, and then varies between positive and negative values of amplitude A1 for the remainder of the measurement period, i.e. intervals T6-T9. This pattern is repeated for a second measurement period T10-T19 and for subsequent measurement periods (not shown). FIG. 14 provides an illustration of such a signal over a measurement period starting at interval T(n) and ending after measurement period T(n+9). Utilizing such a pattern wherein positive and negative values of a second amplitude is introduced for an even number of time intervals causes a variation in light intensity suitable for determining output power, but does not interfere with the IFOGs ability to sense and report rotation.

It should be noted that the pattern of change used causes D2 to fall with D1 and D3 as D3 is the sum of two changes. As such, although the change resulting from use of either D2 is possibly, using the change in intensity caused by D3 involves the use of twice the signal as the change caused by D2 with corresponding benefits.

Figure 15:
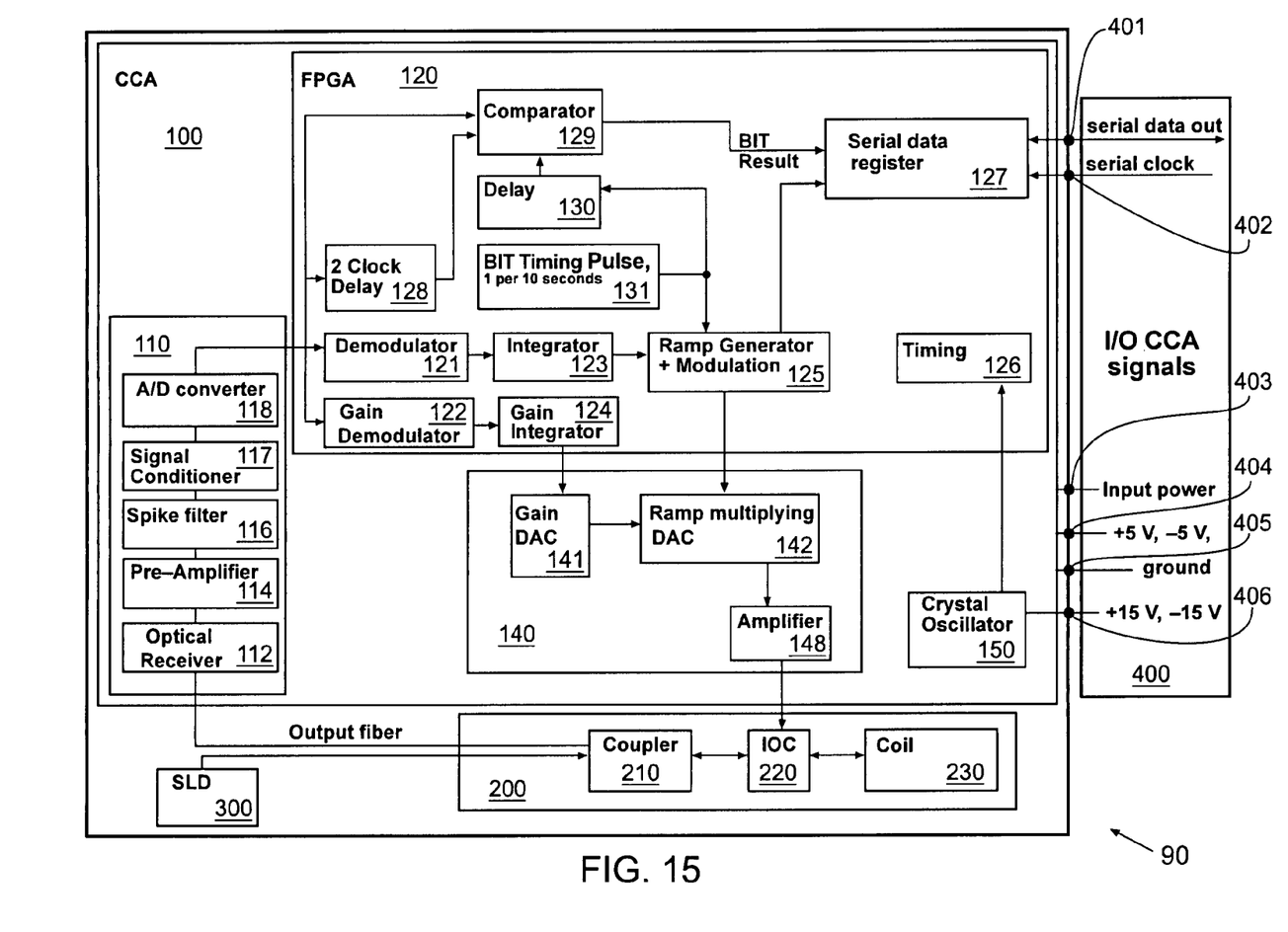
FIG. 15 is schematic view of an optical gyroscope in accordance with an exemplary embodiment of the invention.

Another embodiment of an IFOG that includes mechanisms for performing steps 51, 53, and 55 of the method of FIG. 9 is illustrated in FIG. 15. In FIG. 15, a preferred FOG 90 comprises a controller assembly 100, a coil assembly 200 and an SLD 300. The controller assembly 100 comprises an optical to digital converter module 110, a field programmable gate array (FPGA) 120, output modulator module 140, and an oscillator 150.

The FOG 90, in addition to computing an optical power value, uses the computed value to make a determination as to whether the optical power value is above or below a threshold value. This process will be referred to as performing a BIT test. As such, a BIT test comprises the steps 51, 53, and 55 of FIG. 9, but also includes determining whether the optical power is above or below a threshold value and sending a BIT pass signal if it is, and a BIT fail signal if it is not.

The optical to digital converter module 110 comprises an optical receiver 112, a pre-amplifier 114, a spike filter 116, a signal conditioner 117, and an analog to digital (A/D) converter 118. The optical receiver 112 is a photodiode or other apparatus that converts the light of the combined beam output from the coil assembly 200 to an electrical signal. The pre-amplifier 114 is used to adjust the amplitude of the signal produced, and the spike filter 116 removes the spike when the modulation signal changes and crosses over the peak of the interference pattern. The signal conditioner 117 further amplifies the analog signal and provides low pass filtering to eliminate high frequency noise prior to sampling at the analog to digital converter 118. The pre-amplifier 114, spike filter 116 and signal conditioner 117 are used to shape the signal output by the optical receiver 112 to a signal form suitable to serve as an input to the A/D converter 118. The A/D converter 118 converts the amplified and filtered analog signal from the optical receiver into a digital signal to be fed into the FPGA where it is digitally demodulated at the modulation frequency. The modulation frequency is set by the FPGA based on the time it takes for light to travel the length (which can vary between embodiments) of the coil 230 of the coil assembly 200. For the embodiment of FIG. 15, the frequency would be approximately 80 KHz.

The FPGA 120 is programmed to implement a significant portion of the functionality of the controller 100 including demodulation of the signal provided by the optical to digital converter module 110, determining and outputting a digital value representing either angular rate, position or other desired data (as described further on in relation to the serial data register 127), and generating the modulation and phase ramp signal to be applied to an integrated optical chip (IOC) used to adjust the phase or some other characteristic of the counter propagating beams in the coil. As such, the demodulator 121 demodulates at the fundamental frequency and outputs a value proportional to the error in the control loop. The integrator 123 integrates the value from the demodulator 121 over time which represents the rate that the FOG is rotating at and feeds that output to a ramp generator and modulation unit 125. Outputs from the ramp generator 125 are transmitted to modulation module 140, and serial data register 127.

The FPGA 120 also preferably includes a gain demodulator 122, a gain integrator 124, a timing circuit 126, a two clock delay unit 128, a comparator 129, a delay unit 130, and a BIT timing pulse generator 131. The BIT timing pulse generator 131 generates a signal which starts the BIT function, i.e. the introduction of change in phase modulation that will cause a change in phase difference that can be used to make a determination of optical power. The time between BIT function start signals is the measurement period for the FOG 90. In implementing the FOG 90, the BIT timing pulse generator 131 was set to signal once every ten seconds, but any interval can be accommodated. The output of the timing pulse generator 131 triggers the ramp generator 125 to produce a phase modulation difference on one cycle of the modulation. In implementing the FOG 90, the normal modulation was at plus and minus 90 degrees. The value is changed by x degrees providing modulation of 90−x degrees and −90+x degrees for one or more cycles. Neither modulation at 90 degrees or the value x are critical, and this BIT function can be applied to other types of modulation. It should be noted that the BIT test can be started at either 90−x or −90+x as in either instance the result would be the same.

The BIT timing pulse generator 131 also provides a trigger signal to the delay unit 130. The delay unit 130 delays the trigger by several cycles to account for the delay in the FPGA 100 and optical to digital converter 110. The delay is such that the comparator 129 is comparing the result of the −90+x signal to the −90 degree modulation just prior to the start of the BIT test. A more accurate result could be obtained by averaging the two samples prior to the 90−x sample, but doing so is not required.

The two clock delay unit 128 delays the −90 degree modulation result to the comparator so that it is present at the comparator at the same time as the −90+x signal.

The comparator 129 outputs a BIT pass signal if the output of the comparator 129 is greater than the value that the gains and the applied change in the modulation signal have been determined to represent the optical power threshold. If it is less than this value it puts out a BIT failed value.

Module 140 comprises a gain DAC 141, ramp multiplying DAC 142, and amplifier 148. The gain DAC 141 provides a reference to the ramp multiplying DAC 142 such that the ramp signal applied to the IOC 220 is allowed to vary over a 2 pi range plus the modulation of 180 degrees. The amplifier 148, conditions the DAC output to provide the proper drive to the IOC 220.

The gain demodulator 122 demodulates the signal from the A/D converter 118 and provides this signal to the gain integrator 124. The gain integrator 124 is updated when the ramp generator 125 determines that the required ramp signal is outside the range of the ramp multiplying DAC 142. The ramp generator 125 performs a reset that drives the IOC 220 to reset to an adjacent fringe. The gain integrator 124 compares the A/D converter 118 output prior to the reset to the value after the reset and adjusts to drive the error to zero.

The coil assembly 200 comprises a coupler assembly 210, an IOC 220, and a 2.5 kilometer long fiber optic coil 230. It should be noted that the length of the coil will likely vary between embodiments, with the length not being critical to the present invention other than as a factor in determining time interval duration. However, is likely that many embodiments will have a length between 1 meter and 10,000 meters. Moreover, it is contemplated that lengths between about 120 meters and 3,000 meters may be particularly advantageous. The coil assembly 200 has as inputs light from the super luminescent diode (SLD) 300 and the modulation and phase ramp voltage from the FOG electronics controller module 100. The coupler assembly 210 comprises one or more couplers and is adapted to split light from the SLD 300 into two beams and to feed those beams into the IOC 220, and to combine the two beams after they pass through the coil 230 and to feed the combined beams out of the coil assembly 200 to the controller assembly 100. The IOC 220 performs the function of phase shifting both of the beams in opposite directions as they pass through the IOC 220 to nullify the phase difference between the two beams in response to the output from FOG controller.

The interface array 400 comprises a majority of the inputs and outputs to controller 100. It provides conditioned power to the FOG and a serial clock to the Serial Data Register 127. The serial data out signal comprises the output data from the FOG. This can include angular position and/or rate, BIT test results and other data.

It should be evident from the forgoing that the concept of measuring optical power by temporarily adjusting the phase between counter-propagating light beams has general applicability. Although particularly well suited for IFOGs, it is applicable to any device utilizing counter-propagating light beams where the phase difference between the beams can be set to a first value and kept from changing for a long enough period to provide a first light intensity value, and then set to a second difference and kept from changing for a long enough period to determine the change in intensity caused by the change in phase difference. As such, it may be applicable to any type of device for which it makes sense to measure an optical power, and the optical power can be determined by adjusting the phase between counter-propagating light beams.

Any method for calculating power, at least in part from one or more monitored outputs, may be used. Although the preferred method is to use the change in intensity of a resultant light signal and known characteristics of the device, in some instances other methods may be used.

It is contemplated that the apparatus and methods disclosed herein can be used to facilitate measurement of the optical power at each stage of the manufacture process of a three axis cluster gyro system. During the manufacture process the fibers coming out of the three axis cluster are routed and permanently positioned relative to an optical source and optical receiver. As each fiber is routed around a corner it is crucial to minimize optical power attenuation, and being able to quickly and easily measure optical power greatly simplifies the manufacturing process. Calculating the optical power from a stimulated phase shift is also non-invasive, ie the fibers don't have to be moved to make the optical power measurement.

It is also contemplated that the use of the optical power measurement method disclosed herein provided numerous other benefits. As an example, over a period of time (e.g. months) the mechanical alignments of the fibers at the coupling points in a FOG system can shift, thus changing the optical power. Using the method disclosed herein simplifies the determination of the trend. As another example, over a temperature profile the mechanical alignments of the fiber couplings and the inherent losses of the fibers in the coil can change causing a change in the optical power at the receiver. Using the power measurement method described herein provides a quick easy method to monitor these phenomena. Yet another examples applies to FOGs on satellites. For FOGs on satellites, the fiber undergoes a well known radiation fiber darkening process due to an ionization process in the fiber. In addition the SLD optical source decays over a period of years. The power measurement method described herein provides a quick easy way to monitor this process. It is also contemplated that the process of characterization of the FOG angle random walk (ARW) as a function of optical source SLD current is made quicker and easier using the power measurement method described herein. Moreover, since the control loop is designed to perform over a given range of optical power it could be used to adjust the gain in the FPGA or analog circuitry, or the SLD drive current which determines the optical power, to provide a constant bandwidth.

Optical gyroscopes may vary in the degree to which they incorporate the methods disclosed herein. As such, some gyroscopes may provide inputs to allow an adjustment in phase difference to be input externally, and outputs to allow the light intensity to be measured externally with power values being computed externally. Other gyroscopes may have full support internally and provide a mechanism for outputting an optical power value, either on a regular basis or in response to an external trigger.

In some instances, a particular gyroscope may provide functionality that facilitates self-calibration in place of using a manual procedure to set the initial power of our FOG's that involves inserting a variable current source and adjusting it until a desired output power is obtained. This technique would allow the FOG to be commanded to enter into a self calibration mode where the current could be set with a digital to analog converter, digital potentiometer or other digital device and varied until the desired power is read with the method described herein.

In some instances power could be monitored to either continuously or periodically adjust the optical power to provide operation at a constant power. This could be used to minimize the FOGs power requirements by operating at a lower drive current which would minimize power needs for both the light source and the TEC which maintains the light source at a constant temperature. This would eliminate the need to initially set the optical power to a higher than needed value to take into account reduction of power in the system over time, temperature etc. It could also be used to provide lower unit power at times when system power requirements need to be minimized due to low battery power, or other needs, or reduced operational requirements.

In some instances, the method described herein could be used to monitor the optical power over time. This data could be recorded and/or sent out over telemetry and be used to gather statistical data on aging of the devices. The data could also be used either internally to the FOG's, or externally, to predict failures so that the hardware could be returned for repair prior to failure in the field.

What is claimed is:

1. In a closed loop interferometric fiber optic gyroscope (IFOG) having a light source, an optical circuit splitting the light into counter-propagating first and second light signals, a means for combining the light signals so that the second light signal is out of phase with the first light signal by a first phase difference, and a controller demodulating the combined signals and adapted to derive an interference signal therefrom, a system for measuring optical power of the IFOG comprising:

a phase modulator generating a phase modulation signal to the optical circuit to establish the first phase difference;

a timing pulse generator coupled to the phase modulator and triggering a temporary change in the phase modulation signal causing a second phase difference between the first light signal and the second light signal during one or more cycles of modulation;

a comparator comparing a first interference signal derived by the controller during a modulation cycle in which the first phase difference occurs to a second interference signal derived by the controller during a modulation cycle in which the second phase difference occurs, to obtain a result representing the optical power; and a delay unit ensuring simultaneous presence of the first and second interference signals at the comparator.

2. The system of claim 1 wherein the phase modulator further comprises:

a set of one or more optical phase modulators (OPMs) that introduces a time varying phase difference between the first light signal and the second light signal to create the first phase difference and the second phase difference wherein the controller causes the time varying phase difference to have an absolute value equal to an absolute value of the second phase difference for an even number of successive regular intervals.

3. The system of claim 2 wherein:
the number of successive intervals is two.

4. The system of claim 1 wherein the comparator outputs a failure signal if the result falls below a threshold value stored in the IFOG.

5. The system of claim 1 further comprising an internal timer that initiates calculation of the optical power result at regular intervals.

6. An interferometer fiber optic gyroscope (IFOG) comprising:

a means for causing a first phase difference between counter-propagating light beams;

a means for causing a temporary change to the first phase difference between counter-propagating light beams; and a means for comparing interference corresponding to the first phase difference to interference corresponding to the temporary change to the first phase difference to determine optical power of the IFOG.

7. The IFOG of claim 6 further comprising a fiber optic loop traversed by the counter-propagating light beams, wherein the temporary change to the first phase difference causes a perturbation that lasts for approximately three successive time intervals, each time interval having a duration approximately equal to traversal time of the counter-propagating light beams through the fiber optic loop.

8. The IFOG of claim 7 further comprising a means for outputting a failure signal if the determined optical power falls below a pre-determined threshold value.

9. The IFOG of claim 8 wherein the comparing means compares the interferences a plurality of times, and the outputting means outputs a failure signal if a difference between a most recently determined optical power and an optical power computed from a plurality of previously determined optical powers exceeds a pre-determined threshold value.

10. A method of obtaining an optical power value for an interferometer fiber optic gyroscope (IFOG) comprising:

determining an amount of change in light intensity caused by a temporary change in phase difference between two out-of-phase counter-propagating light beams;

computing an optical power value based on the determined amount of change in light intensity; and recording the computed optical power value.

11. The method of claim 10 further comprising:

temporarily adjusting the phase difference between the two out-of-phase counter-propagating light beams to effect the temporary change in phase difference.

12. The method of claim 11 further comprising:

maintaining an absolute value of the phase difference between the two out-of-phase counter propagating light beams for a first set of successive intervals; and maintaining an absolute value of the phase difference between the two out-of-phase counter propagating light beams for a second set of successive intervals;

wherein both the first set of successive intervals and the second set of successive intervals comprise intervals of uniform duration, the duration being equal to the transit time of light around a fiber optic sensing loop of the IFOG.

* * * * *